United States Patent [19]

Poetsch

[11] Patent Number: 4,524,392
[45] Date of Patent: Jun. 18, 1985

[54] CINE FILM-VIDEO SCANNER SYSTEM

[75] Inventor: Dieter Poetsch, Ober-Ramstadt, Fed. Rep. of Germany

[73] Assignee: Robert Bosch GmbH, Stuttgart, Fed. Rep. of Germany

[21] Appl. No.: 611,020

[22] Filed: May 16, 1984

[30] Foreign Application Priority Data

May 19, 1983 [DE] Fed. Rep. of Germany ....... 3318253

[51] Int. Cl.³ .............................................. H04N 7/18
[52] U.S. Cl. .................................... 358/214; 358/162
[58] Field of Search ............... 358/209, 211, 212, 213, 358/214, 215, 216, 217, 54, 225, 227, 228, 102

[56] References Cited

U.S. PATENT DOCUMENTS

| Re. 31,239 | 5/1983 | Lemelson | 358/102 |
| 4,013,828 | 3/1977 | Judice | 358/133 |
| 4,081,843 | 3/1978 | Okano | 358/294 |
| 4,149,191 | 4/1979 | Langchamp | 358/214 |
| 4,167,754 | 9/1979 | Nagumo et al. | 358/167 |
| 4,237,488 | 12/1980 | Takemura | 358/163 |

FOREIGN PATENT DOCUMENTS 66185 5/1980 Japan ..................... 358/214

Primary Examiner—Gene Z. Rubinson
Assistant Examiner—Robert Lev
Attorney, Agent, or Firm—Frishauf, Holtz, Goodman & Woodward

[57] ABSTRACT

To suppress display of film splices, defects in the film, fade, dissolve, or torn perforation openings upon scanning a film for video reproduction, splices and defects are recognized, and transmission of the frames which include these splices and defects to a memory connected to a film scanner is inhibited, the memory being repetitively read-out to obtain sequential output signals in accordance with the television standard of previously properly scanned frames. Splices and the like can be recognized by an automatic recognition sensor (19), for example sensing optical density, a capacitative sensor or the like; and/or defects can be recognized visually by an operator, and the respective defective or spliced frames entered in a film splice frame memory (23), which, subsequently, inhibits transmission of the respectively spliced or defective frames to the memory (12) receiving the scanned video signals. Since frequently splices occur upon scene change, an automatic scene change recognition network (27) may be used to recognize splices, and to inhibit recording in the memory of frames including the scene change, and hence the splices.

7 Claims, 2 Drawing Figures

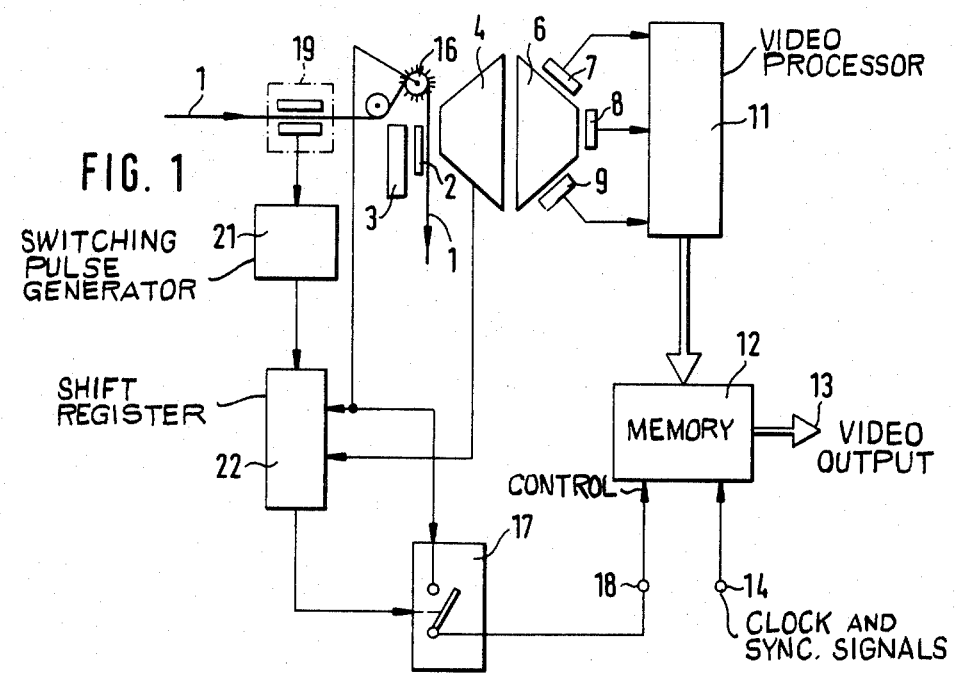
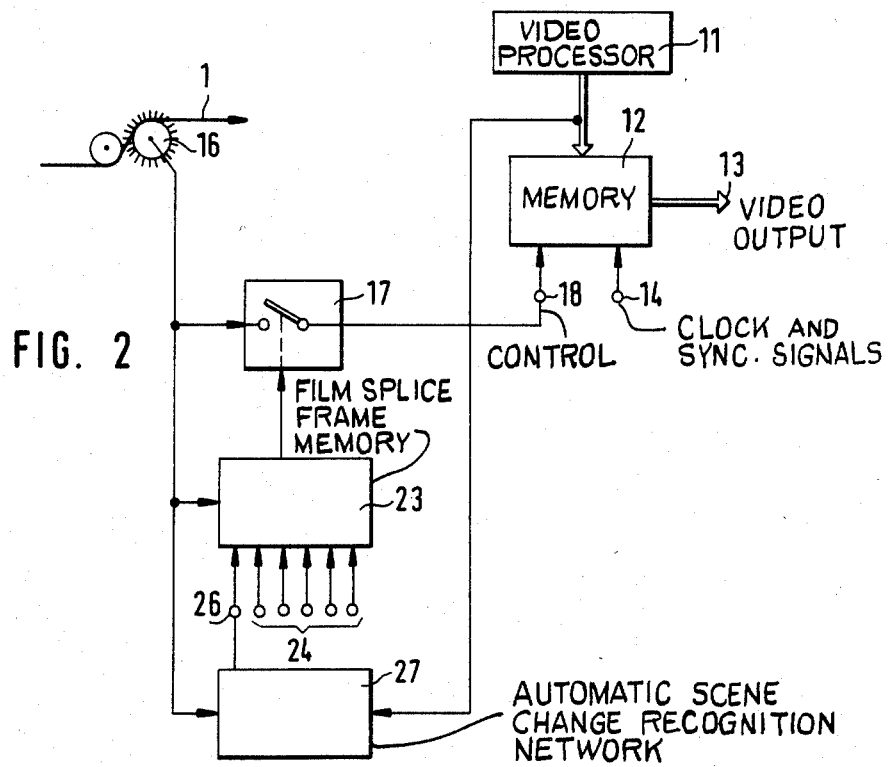

CINE FILM-VIDEO SCANNER SYSTEM

The present invention relates to a film or cine-video scanner system, and more particularly to a system in which disturbances due to scanning of splices or of punch markers are effectively eliminated.

BACKGROUND

Splices and adhesion connections are particularly noticeable when scanning reversal or negative films, especially of the 16 mm format. The splice mark is usually noticed in the reproduced image at the lower edge of the image in advance of the splice, and, after the splice, at the upper edge of the reproduced image. Old motion-picture films often are damaged; individual frames may be damaged by partially torn perforation openings, by fading markers and the like, which may extend into the picture area. Upon scanning, and subsequent television reproduction, such tears, holes, markers indicating fades or dissolves or the like disturb the reproduced television image.

THE INVENTION

It is an object to improve a cine-video scanner in such a manner that visibility of defects arising due to splices, or other damages, is effectively suppressed.

Briefly, a memory is provided which stores signals which are scanned. Read-out of the stored signals is controlled in accordance with television standards to develop suitable video output signals. In accordance with the invention, entry of signals from the scanner, upon occurrence of the splices, or damaged areas, from at least one of the frames of the film is inhibited. The memory is then controlled to be read-out repeatedly, e.g. twice, so that previously stored signals will be utilized to provide the output signal. Loss of information from one frame is less disturbing than observation of a splice or defect on a transduced image, which may appear as a highly contrasting light or dark streak or flash on the reproduced picture.

The system has the advantage that, without adding substantially to existing film scanning apparatus, defects, splices, fade or dissolve marks and the like can be prevented from being reproduced in a television image.

DRAWINGS

FIG. 1 is a general block diagram of an embodiment of the film scanning system in accordance with the invention; and FIG. 2 is a general block diagram illustrating another embodiment.

DETAILED DESCRIPTION

Only those portions of the cine-video chain are shown in the attached drawing, since such cine scanning apparatus is well known and in commercial use. A film 1—see FIG. 1—is fed past a window 2 by a standard film feeding arrangement, for example a continuously or intermittently operating sprocket 16. The scanner includes an illumination device 3, imaging optics 4, color separation optics 6 and opto-electrical transducers 7, 8, 9 which, respectively, are responsive to various color components of the film being scanned. The outputs of the opto-electrical transducers 7, 8, 9 are connected to a video processor 11, for example of commercial construction, in which the video signals are processed, as known, and in accordance with a preferred feature, converted into digital video signals. The output from video processor 11 is connected to a digital video memory 12. The output of the memory 12 is connected to an output terminal 13. The memory 12 is read-out in accordance with clock signals applied to a clock and synchronization signal input 14, in order to provide a video output signal suitable for further transmission, processing and, for example, storing on magnetic tape in a television studio. The video signals are stored in the memory 12 in dependence on the rotation and speed of the sprocket 16. Sprocket 16 provides pulses in synchronism with its rotation to a switch 17 which is connected to the recording-control input 18 of the memory 12.

In accordance with a feature of the invention, a sensor 19 is provided, positioned in advance of the scanning system 2, 3, 4, 6–9. The sensor 19, for example, may be of a well-known infrared light transmission-optical transducer type, or may be a device which responds to changes in the capacity of a capacitor, in which the film 1 forms the dielectric, the capacitor being part of a tank circuit, and changing the frequency of the tank circuit as the characteristics of the dielectric represented by the film changes, for example due to the presence of holes, extra thickness because of splices, or the like. The signal provided by the sensor 19 is applied to a switching pulse generator 21 to be transformed into suitable switching pulses which can be accepted by a shift register 22. The shift register 22 is controlled to shift data therethrough in synchronism with the speed of the film moving through the sensor 19 and past the window 2, as determined by output pulses from the sprocket 16. The shift register 22, thus, will shift in synchronism with the speed of the film 1. In addition, the format of the film, as sensed by the imaging optics 4, may be used to control the shift register 22.

The output of the shift register 22 is connected to a control terminal on the switch 17, and is so connected that the switch 17 will open if a defect, splice or the like is sensed by sensor 19, and the film has advanced to the position in front of the window 2 where the specific defect would be scanned. The shift register, thus, merely shifts the pulses 21 to appear at the output thereof when the zone of the film which caused the sensor 19 to respond is in scanning position before the scanning optics.

Upon opening of the switch 17, the scanned video signal can no longer be stored in the memory 12. Terminal 14 will continue to supply read-out signals which, then, will cause the memory 12 to be repeatedly read-out until switch 17 is again closed and the contents in the memory changed. The output from terminal 13, then, will provide undisturbed video signals from the memory 12.

Embodiment of FIG. 2: The position of defects, disturbance zones, splices and the like can be sensed by the apparatus shown in FIG. 2. Those elements which are the same as in FIG. 1 need not be explained again and have been given the same reference numerals. Rather than using the sensing system formed by the sensor 19, switching pulse generator 21 and shift register 22, a memory 23 is provided which can be controlled, selectively, manually, by a plurality of inputs 24 or by an input 26 which receives signals automatically recognizing a change-of-scene. Automatic scene change recognition networks such as the network 27 are known. In many instances, and particularly in reversal films, splices occur upon scene change.

The inputs 24 are manually entered in the memory 23 by recording the position, for example by film frame number, length of film or the like, of defects, splices and the like determined prior to the scanning of the film for transmission. Preferably, the frame numbers at which defects occur are determined and entered in the memory 23. The automatic scene change recognition network permits control of the output signals from the video processor 11 by control of the switch 17 based on the output from the video processor 11 itself. The video content, that is, the characteristics of the video signal, is recognized automatically upon change of scene, and the switch 17 is controlled via the memory 23 to open immediately. Terminal 26, thus, can be selectively enabled if reversal films are being scanned where, as is often the case, splices occur upon change of scene.

Apparatus for film scanning is described, for example, in U.S. Pat. Nos. 4,281,351 and 4,288,818, both by the inventor hereof. An automatic scene change recognition network is described, for example, in BBC Research Department Report No. 1973/10.

Various changes and modifications may be made, and features described herein may be used with any of the others, within the scope of the inventive concept.

I claim:

1. Cine film-video scanner system having
means (16) for transporting a cine film (1);
a video scanner (4, 6–9, 11) scanning the film and developing electrical signals representative of the scene on the film;
a memory (12) stroing said signals;
and means (14, 18) for controlling read-out of the memory in accordance with a television standard to derive an output signal (13),
and comprising
film splice or damage recognition means (19) located in advance—with respect to the direction of movement of the film—of the video scanner and deriving a "damage" signal;
and means (17) coupled to the film splice or damage recognition means and responsive to said "damage" signal for inhibiting entry into the memory (12) of signals from the video scanner upon sensing occurence of splices or damaged film areas for at least one frame of film,
said memory being controlled to repeat read-out of previously stored signals representative of a previous frame of the film and to provide said output signals.

2. Cine film-video scanner system having
means (16) for transporting a cine film (1);
a video scanner (4, 6–9, 11) scanning the film and developing electrical signals representative of the scene on the film;
a memory (12) storing said signals;
and means (14, 18) for controlling read-out of the memory in accordance with a television standard to derive an output signal (13),
and comprising
data entry and storage means (23) for receiving information regarding the location on the film of splices or damaged areas, and storing data representative of said locations on the film;
and means (17) coupled to said data entry and storage means for inhibiting entry into the memory (12) of signals from the video scanner upon occurence of splices or damaged film areas for at least one frame of film, under control of said data entry and storage means,
said memory being controlled to repeat read-out of previously stored signals representative of a previous frame of the film and to provide said output signals.

3. System according to claim 2, wherein said memory (12) storing the signals derived from the video scanner retains said signals for repetitive read-out at least until signals representative of a scanned film frame subsequent to those stored in the memory are being transmitted to the memory.

4. System according to claim 2, wherein said data entry means includes manually operable inputs (24) recording the location of splices or damaged areas with reference to a characteristic position of the film.

5. System according to claim 4, wherein said characteristic position comprises a frame number.

6. System according to claim 2, wherein said data entry means comprises a scene change recognition means (27) providing an output signal upon recognition of a change of scene.

7. System according to claim 1, wherein said memory (12) storing the signals derived from the video scanner retains said signals for repetitive read-out at least until signals representative of a scanned film frame sugsequent to those stored in the memory are being transmitted to the memory.

* * * * *

UNITED STATES PATENT AND TRADEMARK OFFICE
CERTIFICATE OF CORRECTION

PATENT NO.  :  4,524,392
DATED       :  Jun. 18, 1985
INVENTOR(S) :  Dieter POETSCH It is certified that error appears in the above-identified patent and that said Letters Patent is hereby corrected as shown below:

Claim 1, column 3, line 33, change "stroing" to -- storing --

Claim 3, line 1, column 4, line 27, change "claim 2" to -- claim 1 --

Claim 7, column 4, lines 46 and 47 change "suqsequent" to -- subsequent --

Signed and Sealed this

Twelfth Day of August 1986

[SEAL]

Attest:

DONALD J. QUIGG

Attesting Officer

Commissioner of Patents and Trademarks